United States Patent [19]
TenBrink et al.

[11] Patent Number: 5,469,662
[45] Date of Patent: Nov. 28, 1995

[54] VEHICLE DOOR CONSTRUCTION FACILITATING WINDOW REGULATOR INSTALLATION AND MOUNTING

[75] Inventors: Jay T. TenBrink, Goodrich; Maryanne R. Farkas, Bloomfield Hills; Robert J. Vendt, Macomb Township; Waine T. Brock, Troy, all of Mich.

[73] Assignee: Chrysler Corporation, Highland Park, Mich.

[21] Appl. No.: 333,695

[22] Filed: Nov. 3, 1994

[51] Int. Cl.⁶ ............................................. E05F 11/48
[52] U.S. Cl. ........................ 49/352; 49/349; 49/502; 49/506
[58] Field of Search ..................... 49/352, 502, 506, 49/349, 360

[56] References Cited

U.S. PATENT DOCUMENTS

| | | | |
|---|---|---|---|
| 1,884,139 | 10/1931 | Nicholson . | |
| 4,669,221 | 6/1987 | Ugawa et al. | 49/352 |
| 4,766,697 | 8/1988 | Boileau | 49/352 |
| 4,785,585 | 11/1988 | Grier et al. | 49/502 |
| 4,800,648 | 1/1989 | Nakayama et al. | 29/854 |
| 4,905,412 | 3/1990 | Srock et al. | 49/352 |
| 4,937,977 | 7/1990 | Gergoe et al. | 49/352 |
| 5,067,281 | 11/1991 | Dupuy | 49/502 |
| 5,070,648 | 12/1991 | Moriyama | 49/352 |

*Primary Examiner*—Philip C. Kannan
*Attorney, Agent, or Firm*—Margaret A. Dobrowitsky

[57] ABSTRACT

A vehicle door adapted to accommodate a vertically translating window pane includes an outer door panel and an inner door panel fixed to the outer panel and defining a void therebetween. The inner panel has two access openings to the void and a recessed pan portion extending into the void and separating the openings. The door inner panel also defines four approximately keyhole shaped apertures with one disposed above and below each of the two openings.

7 Claims, 1 Drawing Sheet

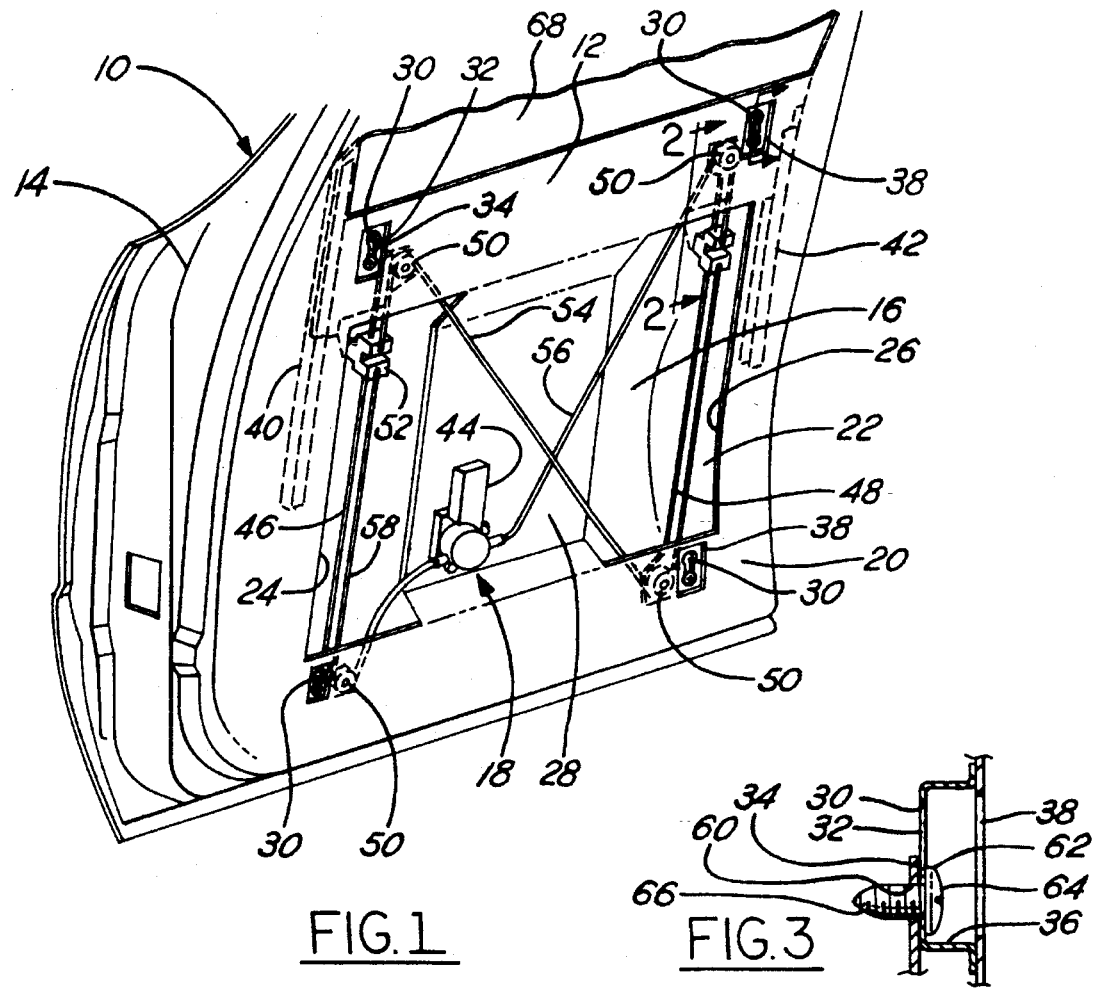
FIG.1
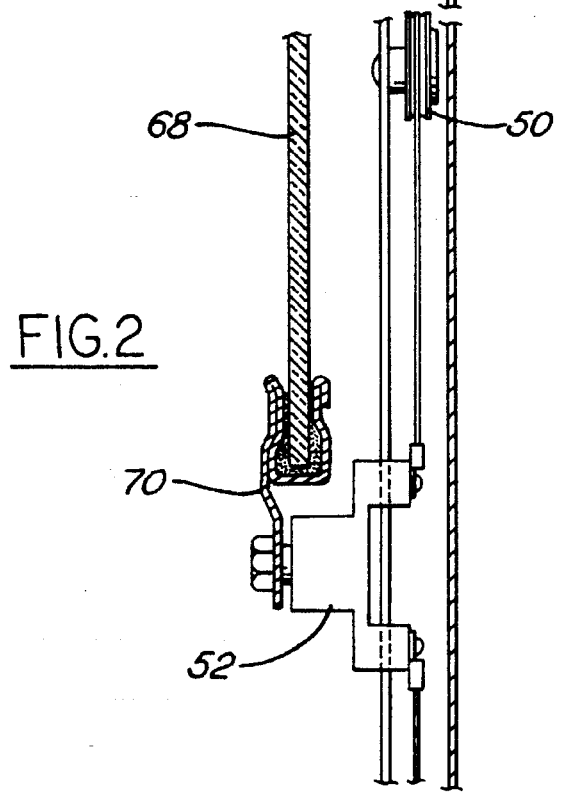
FIG.3
FIG.2

5,469,662

VEHICLE DOOR CONSTRUCTION FACILITATING WINDOW REGULATOR INSTALLATION AND MOUNTING

TECHNICAL FIELD

This invention is directed to motor vehicle doors and the installation of window regulators therein, and more specifically to door configurations accommodating the installation and mounting of dual lift window regulators.

BACKGROUND OF THE INVENTION

Installing window regulators in a vehicle door is a difficult and time consuming assembly operation. Vehicle doors typically have an outer panel and an inner panel fixed to the outer panel and shaped to define a void therebetween.

The difficulty in the installing of window regulators arises from the need for an assembler to pass regulator hardware and their hands through openings in the inner panel. These openings tend to be relatively small, making it difficult to reach inside. Additionally, the assembler must often mount the hardware in a blind operation, such as threading nuts over studs in locations they can reach with their finger tips but are unable to see. Such designs require a high degree of manual dexterity and constant attention to the task at hand to successfully mount the regulator. Any lapse in concentration may potentially result in a fastener, such as a nut, being dropped inside the door. This is particularly undesirable, as the nut may drop to an inaccessible location within the door and subsequently rattle when the vehicle travels over rough roads. Care must also be taken by the assembler to avoid contact with the edges of the opening when passing their hands therethrough to prevent injury.

One approach to eliminating this concern is to employ a modular door insert or cassette. The door is formed with an inner panel opening nearly the size of the entire inner panel. A preassembled door insert, with the window regulator mounted to it is placed over the opening and fastened to the door. The disadvantage of this approach is that there is a large amount of offal generated in the stamping of the inner panels. Additionally, the preassembled door modules are relatively expensive.

It is desired to provide a configuration for a door inner panel facilitating mounting of the window regulator thereto without the use of a door module. It is also desired to eliminate the use of any loose fasteners.

SUMMARY OF THE INVENTION

A vehicle door adapted to accommodate a vertically translating window pane is disclosed comprising an outer door panel and an inner door panel fixed to the outer panel and defining a void therebetween. The inner panel has at least two access openings to the void and a recessed pan portion extending into the void and separating the openings. The door inner panel also defines four approximately keyhole shaped apertures with one disposed above and below each of the two openings.

A door and window regulator combination is disclosed comprising a dual lift window regulator, and a vehicle door. The window regulator includes elongated first and second tracks, a flex member and a winding mechanism positioned between the first track and the second track. The first and second tracks each have a threaded fastener extending through each of the upper end and lower end of the respective tracks and spaced a predetermined distance apart. The winding mechanism engages and operatively displaces a flex member disposed along first and second tracks.

A vehicle door has an inner panel and an outer panel. The door inner panel has two openings in which the tracks are at least partially exposed and a recessed pan portion separating the openings. The winding mechanism is mounted to the recessed pan portion. The inner panel also defines four approximately keyhole shaped openings with a large end sized to accommodate passage of the fastener head there through and a small end sized to prevent passage of the head there through. The keyhole spaced openings are positioned both above and below the openings and spaced apart a distance equalling the distance of the fasteners in the track.

A method of installing a dual lift cable driven window regulator includes providing such a regulator and providing a vehicle door having an inner panel with two elongated vertical openings sized to receive the tracks of the regulator. Both of the tracks are inserted upward through the openings. Premounted fasteners disposed in the tracks are engaged in keyhole apertures in the inner panel. A rearward track is biased downward and fixed in place by tightening the screws. The glass is inserted and mounted to the regulator. The forward track is biased upward with a pry bar to seat the glass properly in an upper edge, and fixed in place by tightening the screws.

BRIEF DESCRIPTION OF THE FIGURES

FIG. 1 is a perspective view of a vehicle passenger door having a window regulator mounted therein.

FIG. 2 is a partial sectional view of the regulator and door in the direction of arrows 2 of FIG. 1.

FIG. 3 is a partial sectional view of an attachment between a track and an inner door panel in the direction of arrows 3 of FIG. 1.

DETAILED DESCRIPTION OF THE PREFERRED EMBODIMENT

A vehicle door 10 has an inner panel 12 into which the supporting structure 14 of the door is formed, and an outer panel 16 defining an outer surface of the door 10. A window regulator 18 is mounted to the inner panel 12. The window regulator 18 is of the dual lift cable and drum type.

The supporting structure portion 14 of the inner panel separates a comparatively flat portion 20 of the inner panel 12 from the outer panel 16, defining a void 22 therebetween. The flat portion 20 of the inner panel 12 has a forward access opening 24 and a rearward access opening 26.

The access openings 24 and 26 are separated by a recessed pan portion 28. The recessed pan portion 28 extends into the void 22. Four approximately keyhole shaped apertures 30 are located both above and below the two access openings. Each of the keyhole shaped apertures 30 has a large end 32 located above a connecting small end 34. In the present embodiment, the keyhole shaped apertures 30 pass through inner panel brackets 36 fixed to an inside of the inner panel 12. Fastener access openings 38 through the flat portion of the inner panel 12 are aligned with the keyhole shaped apertures 30. The keyhole shaped apertures 30 and the fastener access openings 38 for the forward access opening 24 are approximately horizontally aligned with the keyhole shaped apertures 30 and the fastener access openings 38 of the rearward access opening 26.

A forward guide channel 40 and a rearward guide channel 42 have a C-shaped cross section with an open side facing the other channel. The channels 40 and 42 are fixed to the inner panel 12 proximate to opposite distall edges of the access openings 24 and 26. Vertical lines connecting the keyhole shaped apertures 30 across their respective access openings 24 and 26 would be parallel or near parallel to the forward and rearward channels 40, 42.

The window regulator 18 has a motor and drum assembly 44, an elongated forward track 46 and an elongated rearward track 48. A pulley 50 is rotatively mounted at the top and the bottom of both the forward track 46 and the rearward track 48. Alternatively, a radiused low friction slide can be substituted for at least one of the pulleys, such as the lower forward pulley for example. A hand crank can of course be substituted for the motor. A glider block 52 is slidably disposed on each of the tracks between the pulleys 50. Each of the glider blocks 52 are vertically positioned approximately the same distance from the pulleys 50 at the top of their respective tracks 46 and 48. A first flex member or cable 54 extends from the glider block 52 of the forward track upward, over the pulley 50, diagonally downward to the lower pulley 50 of the rearward track 48, and upward to the glider block 52 of the rearward track. A second cable 56 extends upward from the glider block 52 of the rearward track 48, around the upper pulley 50 thereof, diagonally downward to the motor and drum assembly 44. A third cable 58 extends from the motor and drum assembly 44 diagonally downward to the lower pulley 50 of the forward track 46, and upward to the glider block 52 on the forward track.

The forward and rearward tracks 46 and 48 have a mounting aperture 60 located proximate to each of the pulleys 50. A self threading sheet metal screw 62 is threaded into each of the mounting apertures 60. The keyhole shaped apertures 30 have their large ends 32 sized to accommodate passage of a head 64 of the screw 62 therethrough and are vertically separated by a distance equal to a distance between the mounting apertures 60 of the tracks 46 and 48. The small ends 34 of the keyhole shaped apertures 30 are smaller than the head 64, preventing passage of the head 64 therethrough, but are smaller than the threaded shank portion 66. The brackets 36 of the inner panel 12 provide clearance between the tracks 46, 48 and the flat portion 20 of the inner panel 12 sufficient to accommodate the pulleys 50 being located therebetween. Obviously, the spacing can alternatively be provided by a variant forming of the tracks 46 and 48, or by forming a recess in the relatively flat portion of the inner panel.

The glider blocks 52 are used to support a window pane 68. The window pane 68 is slidably disposed in the forward and rearward channels 40 and 42. Two lift plates 70, one at each of the glider blocks 52, are fixed to a lower edge of the window pane 68. The lift plates 70 are adhesively bonded to the window pane 68. The lift plates 70 are then engaged with the glider blocks 52 by bolts or other suitable means, with the window pane 68 resultantly moving with the glider blocks 52.

It is with the assembly of the window regulator 18 to the door 10 that the advantages of this invention are best appreciated. An assembler grasps a window regulator 18 by the forward and rearward tracks 46, 48. Upper ends of the tracks 46, 48 are inserted upward through the forward and rearward access openings 24 and 26 respectively and into the void 22, allowing the lower ends of the tracks 46 and 48 to clear the openings 24 and 26 respectively and be lowered into the void. The access openings 24 and 26 are substantially equal in length to the tracks 46 and 48 to accommodate the entry of the tracks into the void 22. With the tracks thus disposed in the door void 22, the first and second cables 54, 56 cross each other over the recessed pan portion 28. The motor and drum assembly 44 is resultantly disposed over the recessed pan portion 28.

The assembler maneuvers the rearward track 48 to align the heads 64 of the screws 62 with the large ends 32 of the keyhole shaped apertures 30 above and below the rearward access opening 26. The assembler is able to do this without reaching into the void 22 beyond the access opening 26. With the heads 64 aligned with the large ends 32, the assembler pulls the rearward track 48 inward toward himself, causing the heads 64 to pass through the openings 24 in the brackets 36. The assembler then directs the rearward track 48 downward with the screw shanks, until one or both of the screw shanks 66 contacts the inner panel 12 preventing further travel. The screws 62 are then tightened, or torqued, inducing a clamp load between the rearward track 48 and the inner panel 12, and fixing the rearward track 48 to the inner panel 12.

The forward track is similarly manipulated to align the screws 62 with the large ends 32 of the keyhole shaped apertures 30 above and below the forward access opening 24. The forward track 46 is likewise pulled inward and biased downward to capture the heads 64 of the screws 62 in the small diameter portion 34 of the keyhole shaped apertures 30. The window pane 68 is then attached to the regulator 18 by mounting the lift plates 70 to the glider blocks 52. With the glider blocks 52 positioned by the motor and drum assembly 44 to a full upward position, the forward track 46 is biased upward by the assembler using a pry bar between the forward track 46 and a bottom of the door 10 to force an upper edge (not shown) of the window pane 68 to seat in an upper window channel (not shown). This is the only adjustment necessary in installing and positioning the window regulator. With the window regulator's forward track 46 thus positioned, the screws 62 therein are torqued or tightened to provide a clamp load between the forward track 46 and the inner panel 12, thereby preventing movement therebetween.

The motor and drum assembly 44 include cylindrical projections (not shown) formed of rubber or a similar elastomer extending from a mounting surface of the assembly 44. These projections are passed through holes in the recessed pan portion 28 of the inner panel 12. Bolts are passed through the mounting surface and the projections to engage brass nuts disposed at an end of each projection. The brass nuts are disposed on an interior side of the inner panel, opposite the motor and drum assembly. Tightening or torquing of the bolts draws the brass nuts closer to the interior side, compressing the projection. The compressed projection expands radially to prevent the motor from being withdrawn from the inner panel. The use of such an attachment system allows the motor and drum assembly 44 to be mounted to the recessed pan portion 28 without requiring the assembler to put his hand or a tool behind the recessed pan portion 28. Additionally, such a mount system provides vibration isolation between the motor and drum assembly 44 and the door 10. The entire regulator 18 is thus installed in the door 10 without the operator reaching his hand into the void 22 beyond the access openings 24, and without the use of any loose fasteners.

Other aspects, objects and advantages of this invention can be obtained from a study of the drawings, the disclosure and the appended claims.

We claim:

1. A vehicle door and window regulator combination comprising:

a dual lift window regulator having an elongated first track with a pulley at an upper end of the track and a pulley at a lower end of the track and a threaded fastener with a fastener head extending from the track at each of the upper end and the lower end and having a first glider block slidably disposed thereon, an elongated second track with a pulley at an upper end of the track and a pulley at a lower end of the track and a threaded fastener with a fastener head extending from the track at each of the upper end and the lower end and having a second glider block slidably disposed thereon, a flex member extending over the pulleys of the elongated first and second tracks, a winding mechanism disposed between the first track and the second track and engaging and operably displacing the flex member; and a vehicle door to which the dual lift window regulator is mounted having a door inner panel having two access openings in which the tracks are at least partially exposed and a recessed pan portion separating the openings to which the winding mechanism is mounted;

the door inner panel also defining four approximately keyhole shaped apertures receiving the threaded fasteners of the first and second elongated tracks and each having a large end sized to accommodate passage of the fastener head therethrough and a small end sized to prevent passage of the head therethrough positioned in a location above and below the openings separated by a distance equalling a distance between the fasteners in the track.

2. A door and window regulator combination as claimed in claim 1 wherein:

the large ends of the keyhole shaped openings are above the small ends.

3. A door and window regulator combination as claimed in claim 1 wherein:

the access openings expose a substantial portion of the elongated tracks.

4. A vehicle door adapted to accommodate a vertically translating window pane comprising:

an outer door panel;

an inner door panel spaced from the outer panel and defining a void therebetween and having at least two access openings to the void and a recessed pan portion extending into the void and separating the openings; and the door inner panel also defining four approximately keyhole shaped apertures with a large end sized to accommodate passage of a fastener head therethrough and a small end sized to prevent passage of the fastener head therethrough with a first of the apertures disposed above a first of the access openings and a second of the apertures disposed below the first access opening and a third of the apertures disposed above a second of the access openings and spaced a predetermined horizontal distance from the first aperture and a fourth of the apertures disposed below the second access opening and spaced a horizontal distance from the second aperture approximately equalling the predetermined horizontal distance between the first and third apertures and vertically spaced from the third aperture a distance approximately equal to the predetermined distance between the first and the second apertures.

5. A door and window regulator combination as claimed in claim 4 wherein:

the large ends of the keyhole shaped apertures are above the small ends.

6. A door and window regulator combination as claimed in claim 4 wherein:

the access openings are substantially equal in length to elongated tracks of a window regulator.

7. A method of installing a dual lift window regulator comprising:

providing a dual lift window regulator including a forward track and a rearward track, each having premounted fasteners;

providing a vehicle door having an outer panel and an inner panel spaced from the door outer panel and defining a void therebetween, the inner panel also defining two elongated vertical openings sized to receive the tracks;

inserting both of the tracks upward through the openings into the void;

engaging premounted fasteners in the tracks in keyhole apertures in the inner panel;

biasing the rearward track downward;

tightening the screws for the rearward track;

providing a glass window pane;

inserting the glass window pane and mounting the glass window pane to the regulator;

biasing the forward track upward with a pry bar to seat the glass window pane properly; and tightening the screws for the forward track.

* * * * *